United States Patent [19]

Ohtake

[11] Patent Number: 4,563,626
[45] Date of Patent: Jan. 7, 1986

[54] RECHARGEABLE WIRELESS-CONTROL TOY

[75] Inventor: Tsuneo Ohtake, Tokyo, Japan

[73] Assignee: Nikko Co., Ltd., Tokyo, Japan

[21] Appl. No.: 650,003

[22] Filed: Sep. 13, 1984

[30] Foreign Application Priority Data

Nov. 2, 1983 [JP] Japan ............................ 58-169229[U]

[51] Int. Cl.⁴ ........................ H02J 7/00; A63H 29/22
[52] U.S. Cl. ............................................. 320/2; 320/7; 446/454; 446/462
[58] Field of Search ........................................ 320/2-5; 446/454, 456, 462, 484

[56] References Cited

U.S. PATENT DOCUMENTS

| | | | |
|---|---|---|---|
| 2,832,177 | 4/1958 | Mueller | 446/462 |
| 3,628,284 | 12/1971 | Soulakis et al. | 446/462 |
| 3,629,680 | 12/1971 | Baynes et al. | 320/2 |
| 4,160,253 | 7/1979 | Mabuchi et al. | 446/454 X |

*Primary Examiner*—R. J. Hickey
*Attorney, Agent, or Firm*—Young & Thompson

[57] ABSTRACT

A rechargeable wireless-control toy racer is disclosed which includes a wireless transmitter, a control signal from which is received by a wireless receiver for controlling the toy racer. In accordance with the invention the toy racer contains a battery as a power source and is provided with a recharging connector terminal therefor, and that the wireless transmitter is provided with another recharging connector terminal to be connected to another power source and connectable to the first-said recharging connector terminal.

3 Claims, 4 Drawing Figures

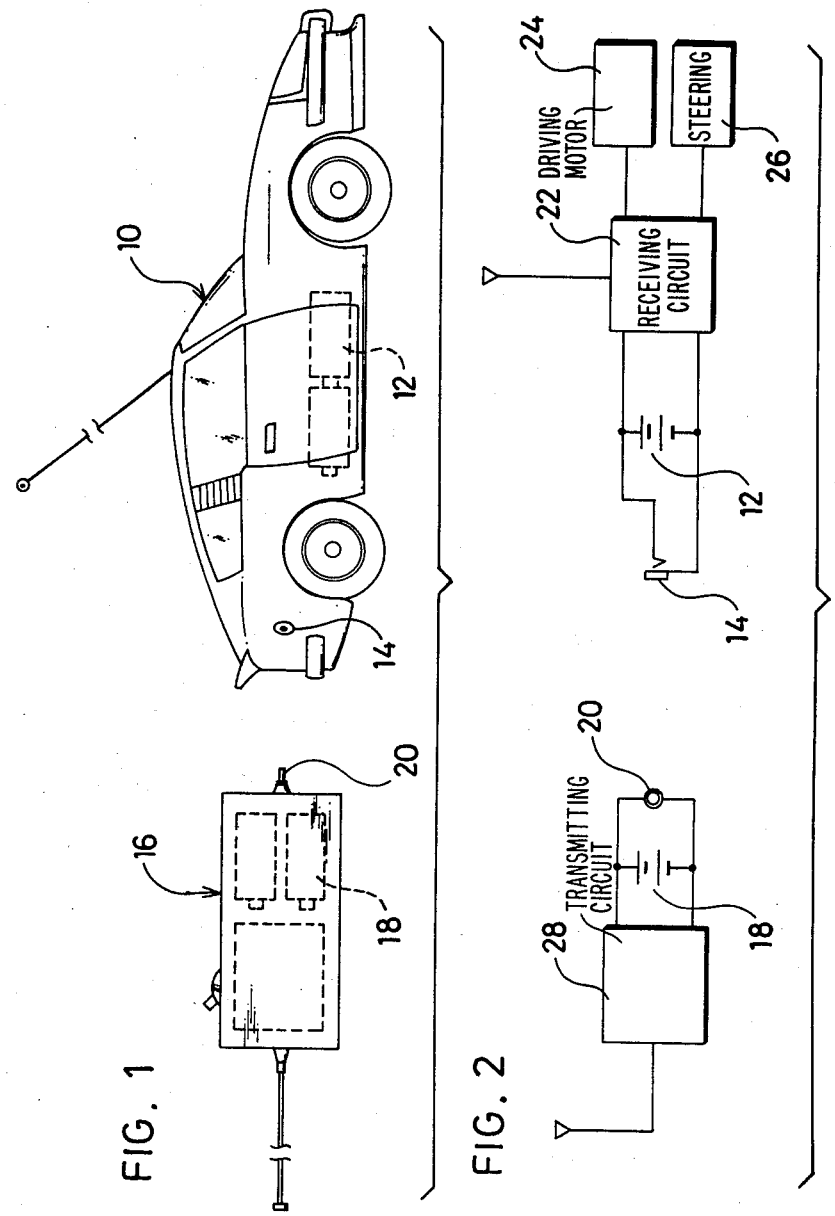

4,563,626

RECHARGEABLE WIRELESS-CONTROL TOY

FIELD OF THE INVENTION

This invention relates to a toy racer which may be wireless-controlled by a wireless set. More particularly, it relates to a rechargeable wireless-control toy racer containing a battery which may be recharged by dry cells accommodated in a wireless transmitter.

BACKGROUND OF THE INVENTION

In a conventional wireless-control toy racer with a wireless set, there has been proposed and used a type containing a nickel-cadmium battery as a control power for a receiver and a driving motor, as well as for a steering mechanism.

In other words, such type of the toy racer consumes a highest amount of power for the driving motor. Thus, if the power source for the driving motor is commonly used for the receiver and for control of the steering mechanism, decrease in a capacity of the battery due to its continuous discharge may lead to inability of normal operation of the receiver and the steering mechanism. For this reason, the toy racer utilizing usual dry cells must replace the depleted cells frequently and uneconomically.

On the other hand, there has also been known a type in which a power source for the control system (such as the receiver and others) is arranged independently and separately from a power source for the driving motor.

In this case, however, depletion of the power sources can not be correctly and conveniently discriminated from each other.

In view of the foregoing, a rechargeable battery has been utilized for the power source of the driving motor and the control system. The toy racer containing such battery, however, requires a separate power source for recharging the battery. In this case, an AC adaptor to be connected to a commercial power source may not be utilized outdoors. Thus, it is inconvenient to prepare a power source containing a rechargeable battery.

Accordingly, an object of the invention is to provide a wireless-control toy racer containing a battery and provided with a recharging terminal therefor, in which a wireless transmitter is provided with a corresponding recharging terminal to be connected to said former recharging terminal of the battery and in which the power source contained in the wireless transmitter is used for a recharging power source, thereby to conveniently and economically recharge the battery for the toy racer.

SUMMARY OF THE INVENTION

In accordance with the invention, there is provided a rechargeable wireless control toy racer having a wireless transmitter, a control signal from which is received by a wireless receiver for controlling the toy racer, characterized in that the toy racer contains a battery as a power source and is provided with a recharging connector terminal therefor, and that the wireless transmitter is provided with another recharging connector terminal to be connected to another power source and connectable to the first-said recharging connector terminal of the toy racer.

Thus, in accordance with the invention, the power source of the wireless transmitter is utilized as a recharging power source for the battery in the power source of the toy racer to be wireless-controlled, so that function of the transmitter may be expanded to provide an econimical and amusing wireless-control toy racer.

Further, in a preferred embodiment of the rechargeable wireless control toy racer according to the invention, the power source of the wireless transmitter comprises a plurality of dry cells which are connected in series to a transmitting circuit through a switch and in parallel to the recharging connector terminal. Thus, a capacity of the power source may be preferably increased upon recharging.

Further, in the wireless control toy racer according to the invention, the dry cells of the power source for the wireless transmitter and the storage battery of the power source for the wireless receiver are preferably connectable through a recharging plug and a recharging socket, and wherein the wireless transmitter on its recharging plug side is provided with a recharging switch while the wireless receiver on its recharging socket side is provided with a contact for disconnection from the receiver circuit upon recharging operation.

The invention will be described hereinbelow for its preferred embodiments with reference to the accompanying drawings.

BRIEF DESCRIPTION OF THE DRAWINGS

FIG. 1 is a schematic view of one embodiment of a rechargeable wireless-control toy racer according to the invention;

FIG. 2 is a basic circuit of a power system for the wireless-control toy racer according to the invention.

PREFERRED EMBODIMENTS OF THE INVENTION

Figure 3:
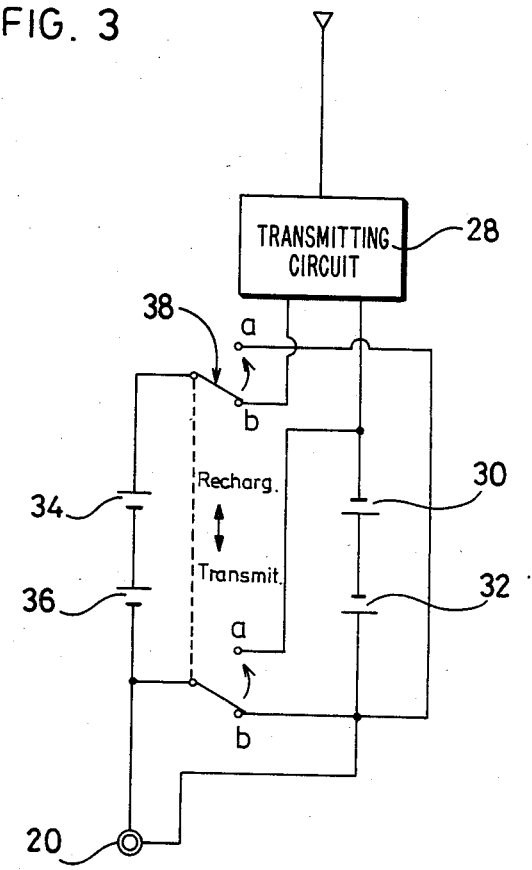
FIG. 3 is a power circuit of one preferred embodiment of the wireless transmitter usable in the invention.

FIG. 1 shows one embodiment of a wireless-control toy racer according to the invention, in which the toy racer 10 contains a driving motor (not shown), a wireless receiver and a steering mechanism. Further, the toy racer 10 utilizes a nickel-cadmium battery 12 as the power source and at its outer side wall is provided with a jack 14 as a recharging connector terminal, which is connected to the battery 12. On the other hand, a wireless transmitter 16 for controlling the toy racer 10 accommodates dry cells 18 replaceably as another power source and at its outer side is provided with a plug 20 as corresponding recharging connector terminal which is connected to the cells 18. Thus, in accordance with the invention, the recharging plug 20 of the wireless transmitter 16 is connected to the recharging jack 14 on the toy racer 10, thereby to allow the battery 12 of the toy racer 10 to be recharged by the cells 18 of the wireless transmitter 16.

FIG. 2 shows a basic power circuit for the embodiment as shown in FIG. 1, in which a numerical reference 22 represents a receiving circuit 22 of the wireless receiver contained in the toy racer 10, through which circuit 22 the nickel-cadmium battery 12 is provided as a common power source for a driving motor 24 and a steering mechanism 26, as well as for the receiving circuit 22. Further, to the battery 12 is connected the normally open recharging jack 14. A numerical reference 28 represents a transmitting circuit of the wireless transmitter 16, the power source for which circuit comprises the dry cells 18 to which is connected the recharging plug 20. Thus, as apparent from FIG. 2, the connection of the plug 20 to the jack 14 ensures the connection of the dry cells 18 to the battery 12 for recharging the latter.

FIG. 3 shows a most preferable power circuit for the wireless transmitter when used in the wireless-control toy racer according to the invention. In this embodiment, four dry cells 30, 32, 34, 36 (1.5 V each) are used, for example, as the power source for the transmitting circuit 28 of the wireless transmitter, in which each pair of the dry cells 30, 32 and 34, 36 are connected in series. When connected to the transmitting circuit 28 through a switch 38, all these dry cells 30–36 are connected in series, while they are connected in parallel when connected to the recharging plug 20. In this case, the switch 38 is connected to a contact (a) for connecting in parallel the cells 30, 32 and 34, 36 in association with the operation for connecting the plug 20 to the jack 14 of the toy racer 10 (see FIGS. 1 and 2), while the separation of the plug 20 from the jack 14 allows the switch 38 to be connected to the other contact (b) for connecting the cells 30–36 in series.

The power circuit of the wireless transmitter thus constructed enables a capacity of the power source to be increased upon recharging, thereby to improve the recharging efficiency.

Figure 4:
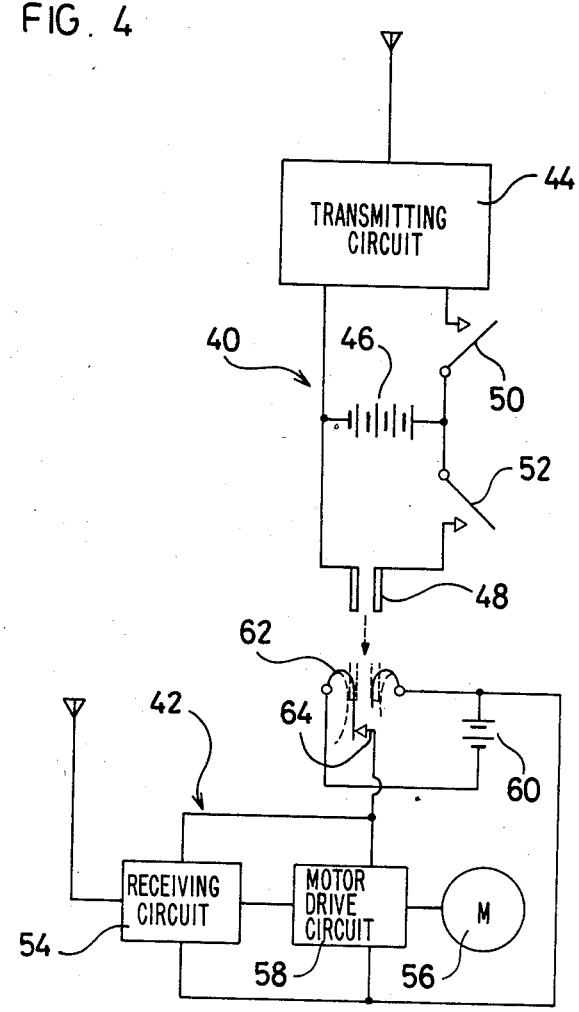
FIG. 4 is a power circuit of another embodiment of the wireless transmitter and receiver useful in the invention.

FIG. 4 shows a power circuit of another embodiment of the wireless transmitter and receiver useful in the invention, wherein a reference 40 represents the wireless transmitter circuit while a reference 42 represents the wireless receiver circuit. The wireless transmitter circuit 40 comprises a transmitting circuit 44, power dry cells 46 and a recharging plug 48. The transmitting circuit 44 and the power dry cells 45 are connected through a transmitting switch 50, while the recharging plug 48 and the power dry cells 46 are connected through another recharging switch 52.

On the other hand, the wireless receiver circuit 42 comprises a receiving circuit 54, a driving motor 56, a motor-driving circuit 58, a power storage battery 60 and a recharging socket 62. The power battery 60 may be connected switchably through a contact 64 of the recharging socket 62 to either the receiving circuit 54, the driving motor 56 and the motor-driving circuit 58 on one hand or to the recharging plug 48 of the wireless transmitter circuit 40 on the other hand.

In accordance with this embodiment thus constructed, the recharging plug 48 of the wireless transmitter circuit 40 is connected to the recharging socket 62 of the wireless receiver circuit 42, thereby to disconnect the contact 64 and thus to connect the power storage battery 60 of the receiver circuit 42 only to the power dry cells 46 of the transmitter circuit 40. Then, the recharging switch 52 is switched on to recharge the storage battery 60 through the dry cells 46. Thereafter, disconnection of the recharging plug 48 of the transmitter circuit 40 from the recharging socket 62 of the receiver circuit 42 may connect the contact 64 thereby to connect the storage battery 60 to the receiving circuit 54, the driving motor 56 and the motor-driving circuit 58. Upon this condition, the transmitting switch 50 of the receiver circuit 40 may be switched on to transmit an instruction signal from the transmitting circuit 44 to the receiving circuit 54 for controlling the motor-driving circuit 58 and thus operation of the driving motor 56.

It will be appreciated from the foregoing that in accordance with the invention the battery is used as the power source for the wireless-control toy racer which is provided with the recharging connector terminal (recharging jack) while the power source of the wireless transmitter is utilized for the recharging power source, so that any special recharging power source is not required for recharging the battery of the toy racer, resulting in the convenient and economical operation.

Particularly, the wireless transmitter consumes a less amount of power, so that the utilization of the dry cells contained therein for the recharging power source gives a function of a recharger and produces a very convenient portable wireless-control toy racer.

Although the invention has been described hereinabove with its preferred embodiments, many variations and modifications, for example, in types of the battery and the recharging battery as well as connecting methods, may be made without departing from the spirit and scope of the invention. Further, it will be appreciated that the invention may be applied to any other wireless-control toys rather than the toy racer as described herein.

What is claimed is:

1. A rechargeable wireless control toy racer including a wireless transmitter, a control signal from which is received by a wireless receiver for controlling the toy racer, characterized in that the toy racer contains a battery as a power source and is provided with a recharging connector terminal therefor, and that the wireless transmitter is provided with another recharging connector terminal to be connected to another power source and connectable to the first-said recharging connector terminal of the toy racer.

2. The rechargeable wireless control toy racer according to claim 1, wherein the power source of the wireless transmitter comprises a plurality of dry cells which are connected in series to a transmitting circuit through a switch and in parallel to the recharging connector terminal.

3. The rechargeable wireless control toy racer according to claim 1, wherein dry cells of the power source for the wireless transmitter and a storage battery of the power source for the wireless receiver are connectable through a recharging plug and a recharging socket, and wherein the wireless transmitter on its recharging plug side is provided with a recharging switch while the wireless receiver on its recharging socket side is provided with a contact for disconnection from the receiver circuit upon recharging operation.

* * * * *